Jan. 23, 1940.  J. B. MONCRIEF  2,187,982
AIR-CONDITIONING SYSTEM AND APPARATUS
Filed May 12, 1938   5 Sheets-Sheet 1
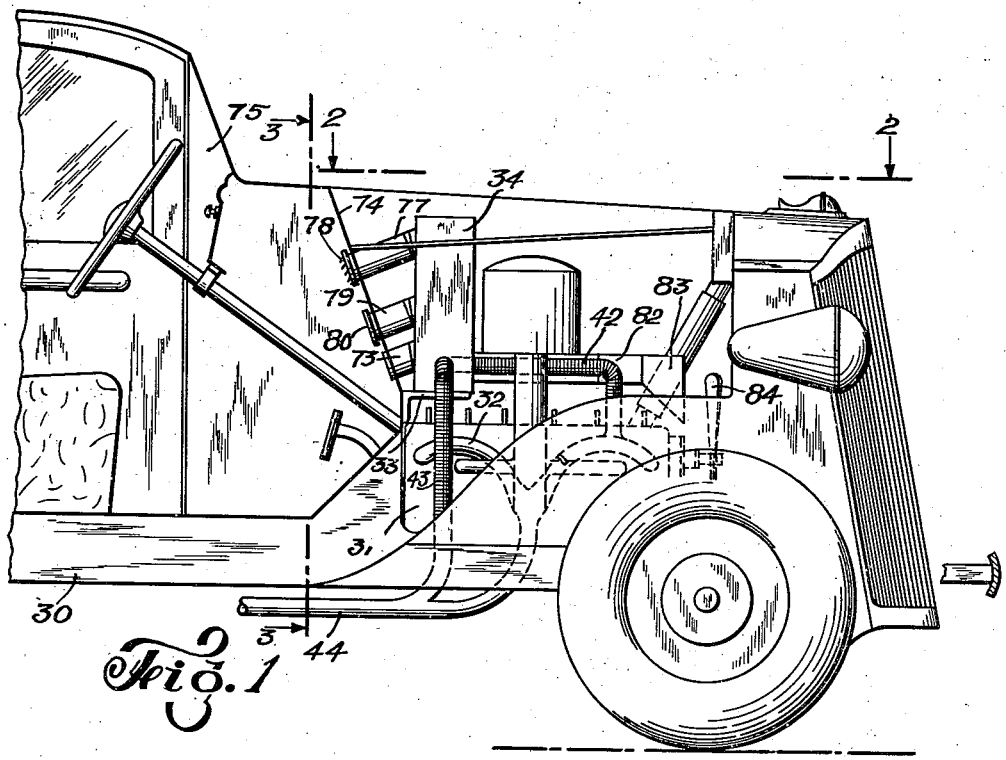
Fig. 1
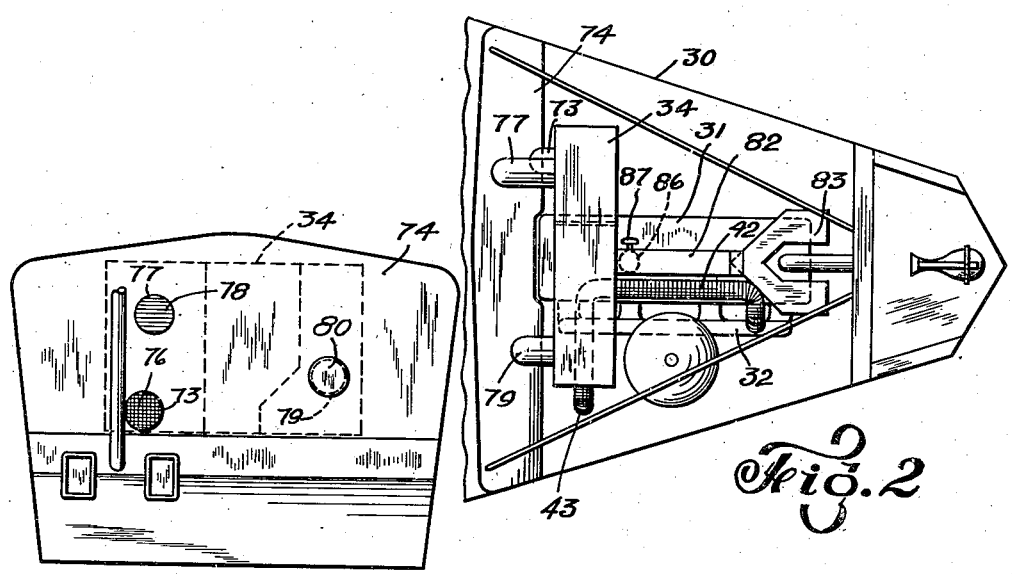
Fig. 3
Fig. 2
INVENTOR
JAMES B. MONCRIEF
BY
ATTORNEYS Jan. 23, 1940.    J. B. MONCRIEF    2,187,982
AIR-CONDITIONING SYSTEM AND APPARATUS
Filed May 12, 1938    5 Sheets-Sheet 2
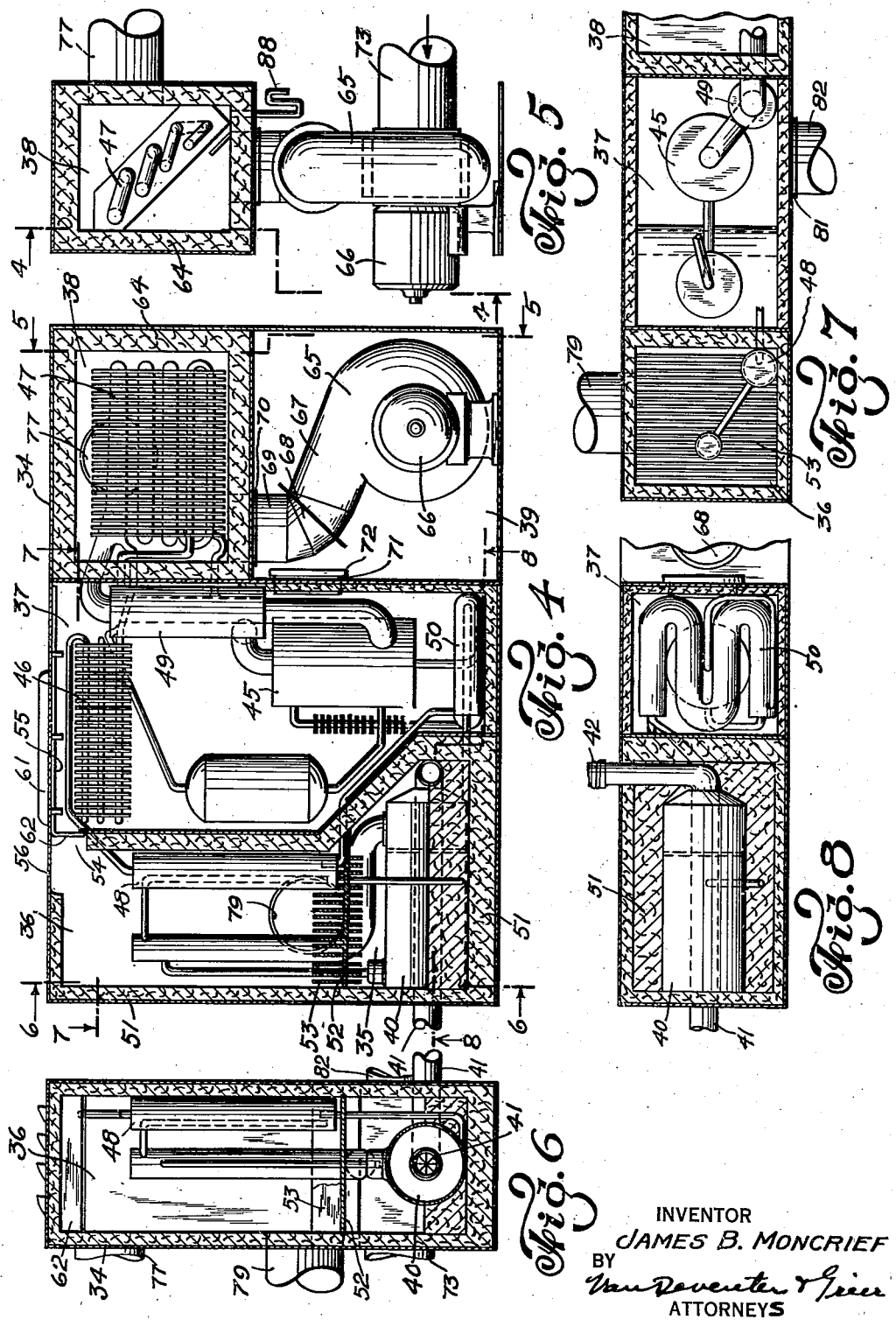
INVENTOR
JAMES B. MONCRIEF
BY
ATTORNEYS

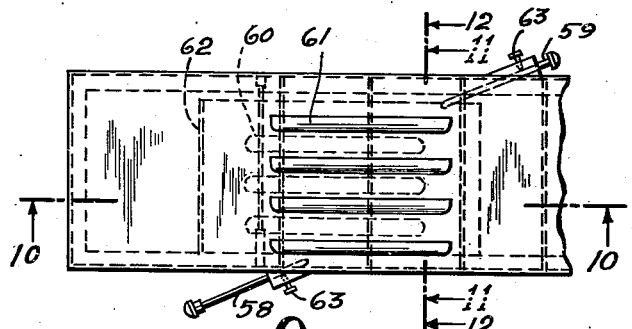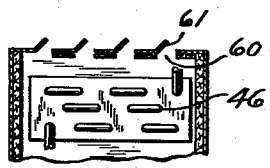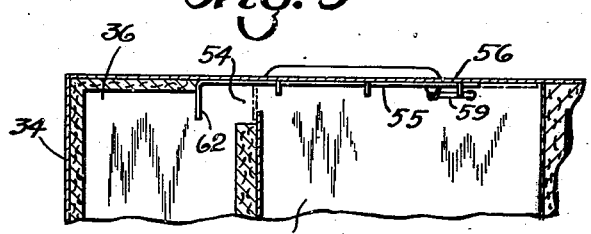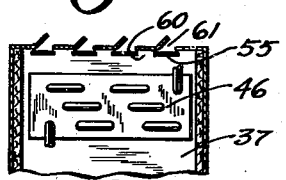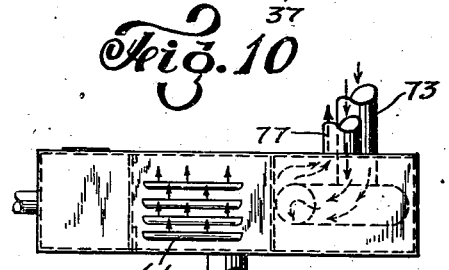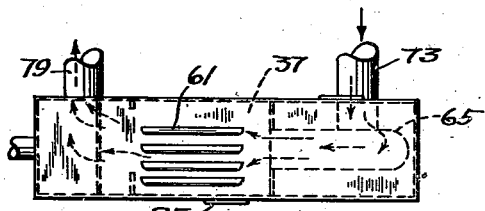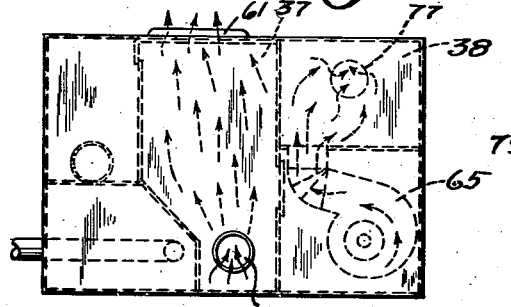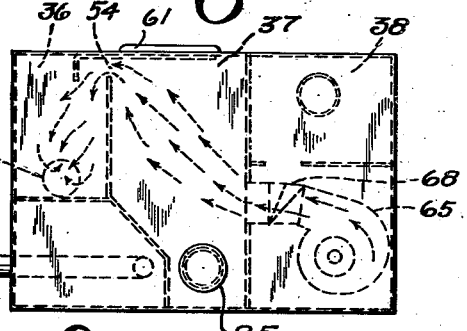

Jan. 23, 1940.    J. B. MONCRIEF    2,187,982
AIR-CONDITIONING SYSTEM AND APPARATUS
Filed May 12, 1938    5 Sheets-Sheet 4
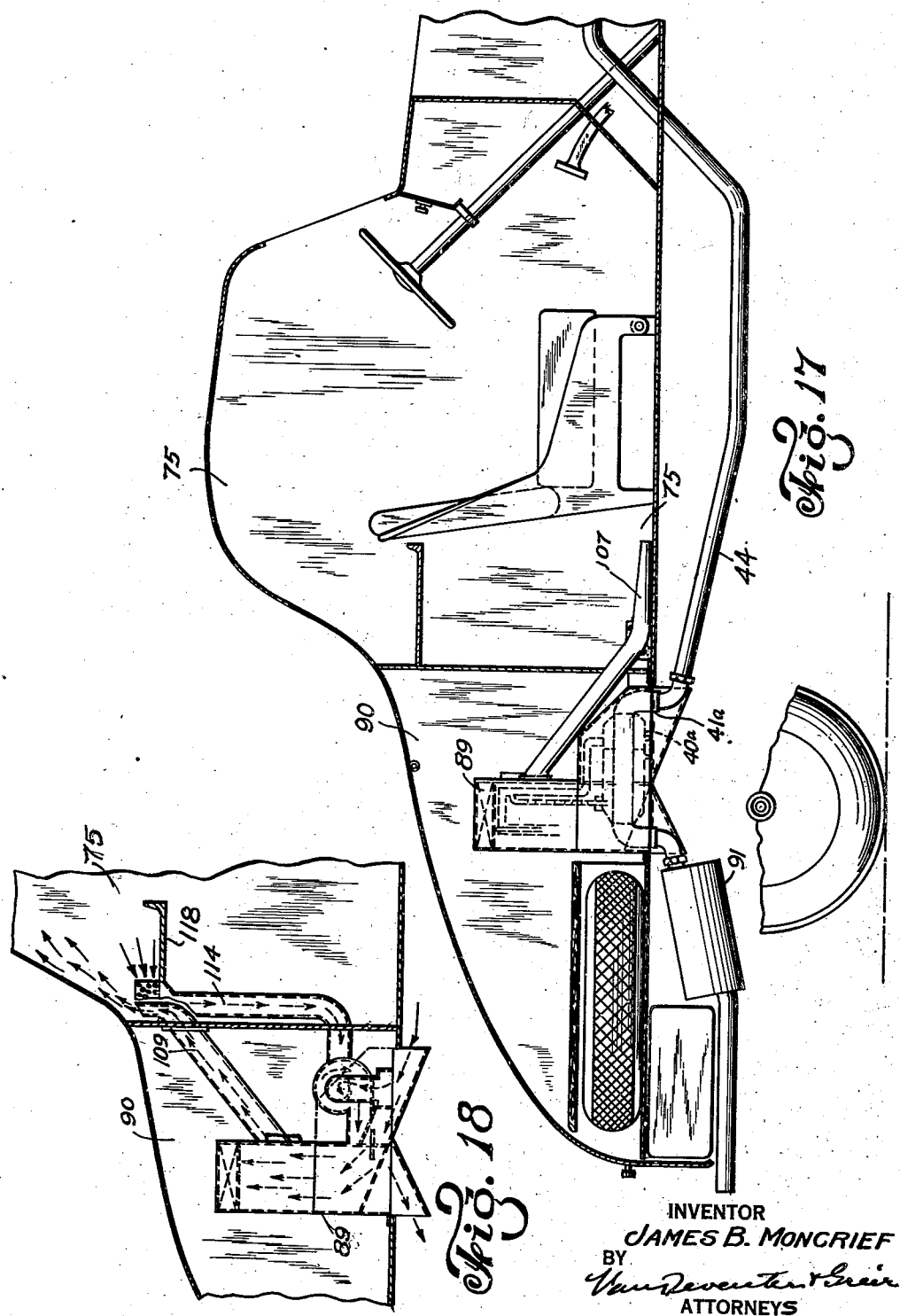
INVENTOR
JAMES B. MONCRIEF
BY
ATTORNEYS Jan. 23, 1940.  J. B. MONCRIEF  2,187,982
AIR-CONDITIONING SYSTEM AND APPARATUS
Filed May 12, 1938   5 Sheets-Sheet 5
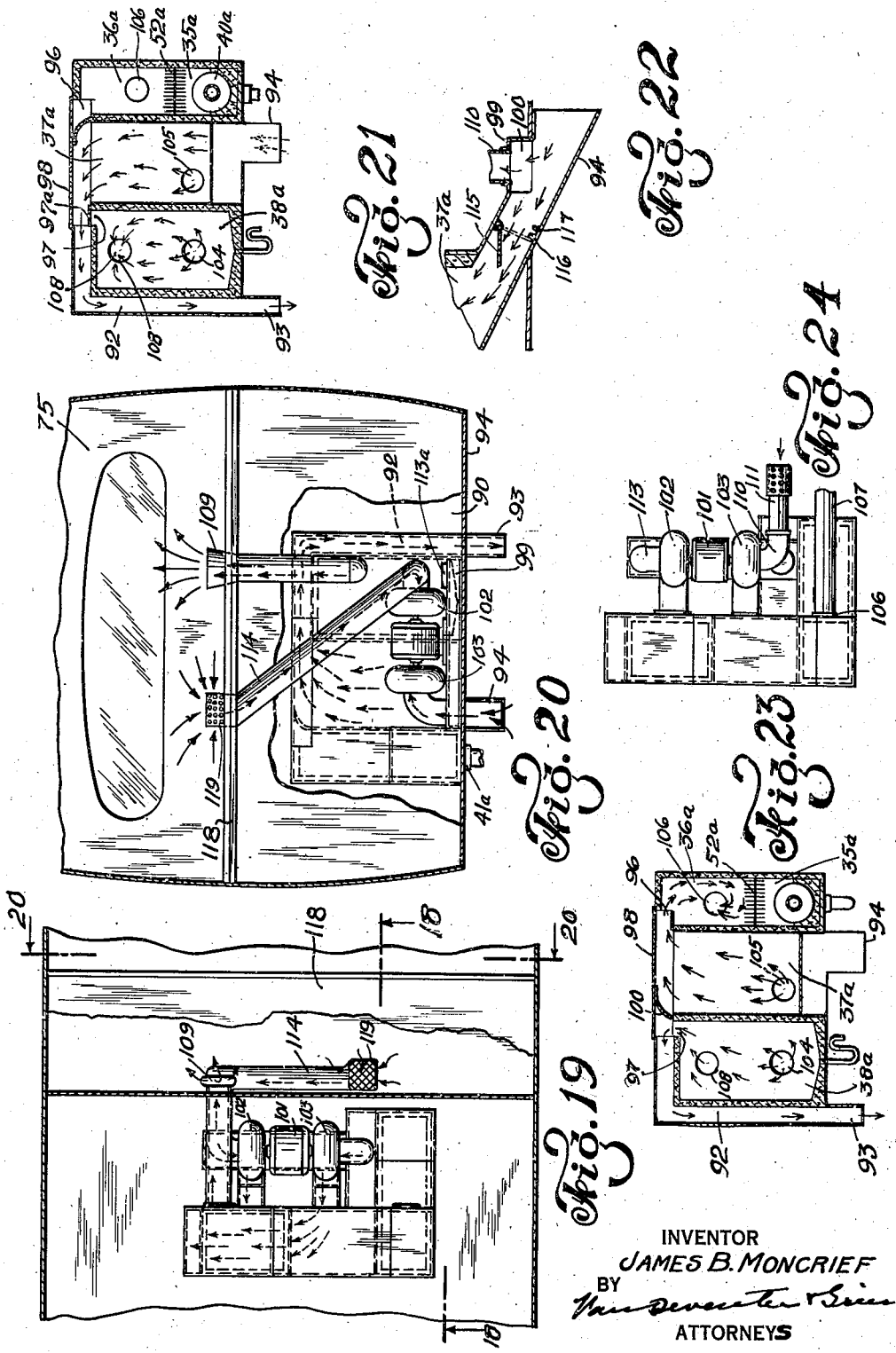
INVENTOR
JAMES B. MONCRIEF
BY
ATTORNEYS Patented Jan. 23, 1940

2,187,982

UNITED STATES PATENT OFFICE 2,187,982

AIR-CONDITIONING SYSTEM AND APPARATUS

James B. Moncrief, Copperhill, Tenn.

Application May 12, 1938, Serial No. 207,469

18 Claims. (Cl. 257—7)

This invention relates to improvements in air-conditioning system and apparatus.

An object of the invention is to provide an improved system and apparatus of the above nature applicable to automotive vehicles.

Another object is to provide apparatus of the above type adapted to both summer and winter operation.

A further object is to provide an improved system of the above type including an absorption refrigerating device utilizing the exhaust heat of the vehicle's engine.

A still further object is to provide a system and apparatus of the above type utilizing heat absorbed from the atmosphere by reversed refrigeration effect during winter operation.

Another object is to provide a system of the above type utilizing heat from the engine to actuate the generator and employing the cooling means of the engine to extract heat from the heat rejecting section of the system.

Still another object is to provide improved means to control the circulation of air for summer and winter operation.

Other objects and advantages of the invention will be apparent during the course of the following description in connection with the accompanying drawings, in which Figure 1 is a partly broken away side view of the forward part of an automobile including a preferred form of the invention;

Figure 2 is a similar plan view of the same;

Figure 3 is a rear view of the rear wall of the engine compartment showing the air discharge and inlet in the passage space;

Figure 4 is a front view of the refrigerating apparatus with the casing cut away to show the interior parts;

Figure 5 is a detail right side view of the blower and evaporator structures with the casing cut away on the line 5—5, Figure 4;

Figure 6 is a vertical sectional view on the line 6—6, Figure 4;

Figure 7 is a partial horizontal section viewed downward on the lines 7—7, Figure 4;

Figure 8 is a partial horizontal upwardly directed sectional view on the line 8—8, Figure 4;

Figure 9 is a detail top view of the top louvres;

Figure 10 is a fragmental vertical sectional view of the top louvres and ducts;

Figure 11 is a fragmental sectional view showing the louvres in open position for summer operation;

Figure 12 is a similar view showing the louvres closed for winter operation;

Figure 13 is a diagrammatic top view showing the paths of air movement through the device in summer operation;

Figure 14 is a similar view showing the air movement during winter operation;

Figure 15 is a diagrammatic front view corresponding to Figure 13;

Figure 16 is a similar view corresponding to Figure 14;

Figure 17 is a longitudinal sectional view of the rear portion of a motor car showing an alternative form and location of the invention, showing the parts arranged for winter operation;

Figure 18 is a diagrammatic side view of the alternative form illustrating the air circulation in summer operation;

Figure 19 is a top view of the alternative form;

Figure 20 is a front view of the same with the rear of the driver's seat and other parts cut away;

Figure 21 is a vertical sectional view of the alternative form of casing for the unit shown in Figures 17, 18, 19 and 20, parts of the refrigerating unit itself being removed to clarify the showing of the air circulation through the various compartments during summer use;

Figure 22 is a sectional detail view of the air intake and control valve in the alternative form;

Figure 23 is a view similar to Figure 21 but arranged for winter operation; and

Figure 24 is an exterior plan view of the alternative refrigerating unit casing showing the air duct arrangement for winter operation.

Referring to Figures 1 and 2, the numeral 30 generally designates an automobile having an internal combustion engine 31 provided with an exhaust manifold 32. A bracket 33 supports a casing 34 arranged transversely in the rear of the engine compartment above the engine 31.

Referring to the front sectional view, Figure 4, it will be seen that the casing 34 comprises five interior compartments 35, 36, 37, 38 and 39.

The compartment 35 contains a generator 40 forming part of an absorption refrigeration system and having an interior heating pipe 41. A conduit 42, preferably of the flexible metallic type, connects the exhaust manifold 32 with the heating pipe 41, while a similar conduit 43 leads from the heating pipe 41 to the main exhaust pipe 44 of the automobile.

The compartment 37 contains the absorber 45 and condenser 46 of the refrigerating system, while the evaporator 47 is disposed in the compartment 38. The absorption refrigeration system illustrated is of the partial pressure type utilizing hydrogen in the evaporator and absorber and comprising the usual auxiliary parts such as the analyzer 48 and heat exchangers 49 and 50. It will be understood that the exact nature of the absorption system used forms no part of the present invention, and as the construction, connections and operation of systems such as that illustrated are well known to those skilled in the art, no detailed explanation is herein required.

The compartment 35 is provided with interior heat insulating material 51 at the bottom and extending up its side walls, the generator 40 being embedded approximately to its middle in the bottom insulation. A gas-tight partition 52, of heat conducting material such as metal, separates the generator compartment 35 from the overlying compartment 36, and fins 53 are provided on both sides of partition 52 to transfer heat from the compartment 35 to the compartment 36, as hereinafter set forth.

The compartment 36 is insulated by means of material 51 on the interior of its sides and top except for an opening 54 in the upper corner leading into the absorber and condenser compartment 37. A shutter 55, shown in detail in Figures 9 to 12, is slidably secured inside the top 56 of the casing 34 so as to overlie the compartment 37, and has a downwardly extending angle 62, Figures 4 and 10. Diagonal push rods 58 and 59, Figure 9, extending outwardly through the casing 34 and guided therein, are secured to the shutter 55 and provide exterior means for sliding the shutter diagonally from left to right or vice versa.

The shutter 55 is provided with slots 60, Figures 9, 11 and 12, adapted to register with louvres 61 in the top 56, as shown in Figure 11, but held out of registry therewith as shown in Figures 9 and 12 when the device is adjusted for winter operation.

A downwardly depending angle 62 on the left end of shutter 55, Figure 4, closes the opening 54 when the device is in summer operating position, but clears the opening 54 when slid to the left, Figure 10, for winter operation. Set screws 63, Figure 9, are provided to hold the rods 58 and 59 and shutter 55 in either extreme position.

The compartment 38, housing the evaporator 47, is insulated by means of material 64. A blower 65, Figures 4 and 5, disposed in the compartment 39 and provided with an electric motor 66, has a discharge duct 67 connected for summer operation through an elbow 68, short pipe 69 and inlet collar 70 with the evaporator compartment 38. A second collar 71, leading into the condenser and absorber compartment 37, is provided in line with the elbow 68 and is closed with a removable cap or plug 72 for summer operation. The elbow 68 is of the reversible type and for winter operation may be shifted to connect the pipe 69 to the second collar 71, the first collar 70 being left open. Thus, it will be seen that the blower 65 discharges into the evaporator compartment 38 for summer operation and into the condenser-absorber compartment 37 in winter. The motor 66 is adapted to be energized by the car battery, and is controlled by a suitable switch (not shown) on the dash-board or "instrument panel".

The compartment 9 may be open to the atmosphere at the front, back or both, providing ventilation for the motor 66 and allowing outside air to enter the evaporator compartment 38 through the collar 70 during winter operation.

The blower 65 has an inlet duct 73 leading through the rear wall 74 of the engine compartment from the passenger compartment 75 of the car as shown in Figures 1 and 3. This inlet duct is provided with an air filter 76. A second duct 77 leads from the evaporator compartment 38 to the passenger space 75, and is equipped with directional fins 78 of a well-known type at its point of discharge under the dash board, Figure 3. A third duct 79, which may also be equipped with directional fins (not shown) connects the compartment 36, Figure 4, with the passenger space. This duct 79 is closed by a cap or plug 80 for summer service. In winter service the cap 80 is removed from duct 79 and used to close duct 77 as hereinafter set forth.

An air opening or collar 81, Figures 7, 13 and 15, has connected thereto a pipe 82 extending forward over the engine 31 and terminating in inlet funnels 83 behind the radiator fan 84 of the engine so as to receive the blast of fan 84. For winter service, the pipe 82 may be removed from collar 81 and replaced by a closure cap 85 as shown in Figures 14 and 16. Obviously, if desired, the pipe 82 may be provided with a butterfly valve 86 of the usual damper type operable by a handle 87, Figure 2, in which case this pipe may be left in place and closed off by means of the above valve for winter operation. Also, it is obvious that the directional shutters of the circulating ducts 77 and 79, Figures 1 and 3, can be made of the well-known adjustable type adapted to be closed off entirely, in which case the cap 80 may be dispensed with. The pipe 82 normally is insulated to prevent it from picking up heat from the engine. In winter service the pipe 77 may also be removed, leaving the shutter 78 in place but opening the evaporator compartment 38 to the atmosphere.

For summer service the operation of the device is as follows:

Referring to Figure 4, the exhaust gases passing through the heater pipe 41 in the generator 40 heat the ammonia liquor in the latter and actuate the refrigerating system in a well-known manner, the hot ammonia vapor passing into the condenser 46 where it is liquified, thence to the evaporator 47 where it evaporates to create a low temperature, thence to the absorber 45 and back to the generator 40. During this operation the shutter 55 is in the position shown in Figures 4 and 11, the louvres 61 being open and the opening 54, Figure 4, closed by the angle 62. At the same time the blower 65 is connected as shown in Figures 4 and 5, with the air ducts 73 and 77 open to the passenger space 75. As the car is operated, the blast of air from the fan 84 and from the car's motion enters through the pipe 82 and collar 81 to the compartment 37, passes upward therethrough around the absorber 45 and condenser 46 and out the top louvres 61, thereby cooling the condenser and absorber and discharging their heat to the air of the engine compartment.

The blower 65 being in operation and the ducts 73 and 77 open as shown in Figure 3, air from the passenger compartment 75 is drawn through the filter 76 to the blower 65 and forced through the evaporator compartment 38 and back into the space 75 through the directional vanes 78 of the duct 77. In its passage over the evaporator 47 the air is cooled and partially dehydrated. It enters the passenger compartment at a lowered temperature and humidity to provide a comfortable atmosphere therein.

As the air of the passenger compartment is continuously re-circulated through the evaporator compartment the amount of refrigeration required is kept at a minimum, the only outside air to be treated being that necessary for ventilation. As the treated air is continuously filtered by the filter 76 in the inlet duct 77, it is also evident that the recirculation reduces to a minimum the amount of dust which must be removed by the filter.

A trap 88, Figure 5, is provided to eliminate condensate from the evaporator compartment 38.

From the foregoing it will be noted that in summer operation there are two separate air currents passing through the casing 34; the heat removal to the outside being furnished by a blast of air due to the engine fan and motion of the car, while the current of recirculating conditioned air is provided by the blower 65. The relative paths of the two air currents as described may readily be followed by reference to diagrammatic Figures 13 and 15.

For winter operation the shutter 55 in the top 56 of the casing 34 is shifted by means of the push-rod 59 to the position shown in Figures 9, 10 and 12, thereby closing the louvres 61 and freeing the opening 54 between the condenser-absorber compartment 37 and the compartment 36. The blower elbow is shifted as previously described and as shown diagrammatically in Figures 14 and 16, to discharge into the condenser-absorber compartment 37. The opening of duct 77 to the passenger compartment, Figure 3, is closed and the duct 79 thereto is opened. The front air inlet collar 81 of the condenser-absorber compartment is closed, either by means of the butterfly valve 86 in the pipe 82 or by removal of the latter and substitution of the cap 85, Figures 14 and 16, as previously described.

The collar 70, Figure 4, is allowed to remain open to the atmosphere (the blower pipe 69 having been removed therefrom), and a second atmospheric opening to the compartment 38 may be provided if desired by removing the duct 77 while leaving its terminal closure 78 intact in the partition 74. By the above means it will be seen that a natural circulation of outside air can take place through the evaporator compartment 38, since the blower compartment 39 is open to the atmosphere as previously set forth.

In winter operation, with the above described arrangement, the blower 65 draws air from the passenger compartment through the inlet duct 73 and filter 76 and forces it into the condenser-absorber compartment 37, thence through the opening 54, down through the compartment 36 and back to the passenger compartment through the duct 79. In its passage through the compartment 37, the circulating air removes heat from the absorber 45 and condenser 46, while in its passage through the compartment 36 it receives additional heat given up by the generator 40 to the fins 53 and partition 52 and conducted thereby into the path of the air-stream in compartment 36.

The refrigerating system being in operation, the evaporator 47 is maintained at lower temperature than the outside air having access to it, and thus absorbs outside heat therefrom, this heat passing into the system to be given up to the circulating air stream described. This additional heat absorbed from the outer air is thus made available for heating by the so-called reversed refrigerating effect.

From the foregoing, it is evident that in winter operation the air continuously recirculated through the passenger compartment is warmed both by heat taken up from the absorber 45, condenser 46 and related parts, this heat including the heat absorbed from the atmosphere by the evaporator 47, and by heat given up by the generator 40 and such portion of the heating exhaust pipe 41 as is exposed within the chamber 35. The heat from the generator and pipe 41 is given indirectly to the air-stream through the conducting fins 53 and gas-tight partition 52, the latter making it impossible for any fumes which might be present in case of exhaust or other leakage in compartment 35 to be entrained in the air-stream and be carried into the passenger compartment.

Since in both summer and winter operation the circulation through the passenger space 75 is furnished by means of the blower 65, it is obvious that the speed of circulation may be adjusted at will in a well-known manner by means of the adjustable shutter on the discharge openings as previously noted.

In the alternative form of the device shown in Figures 17 to 24, the refrigerating unit casing 89 is arranged in the rear or luggage compartment 90 in the car. The heater pipe 41a of the generator 40a is connected in the exhaust line between the main exhaust pipe 44 and the muffler 91.

Viewing the casing 89 from the rear in the sectional detail views 21 and 23, the numeral 35a denotes the generator compartment, 36a the compartment immediately above the latter and separated therefrom by the finned conducting partition or sealing wall 52a, 37a the condenser-absorber compartment, and 38a the evaporator compartment.

A duct 92, Figures 21 and 23, leads along the top and down the side of the casing 89 outside the insulated evaporator compartment 38a and terminates in a rearwardly directed discharge scoop 93 open to the outside air below the car floor 94. A forwardly-directed inlet scoop 95, also depending below the floor 94, is connected into the bottom of the absorber-condenser compartment 37a.

The compartments 36a and 38a have openings 96 and 97 respectively in their upper inward corners, Figures 21 and 23. A removable cover 98 has a flat cross member 97a and a curved partition 100 adapted to close off the openings 96 and 97 for summer operation as shown in Figure 21, the compartment 37a being in communication with the duct 92. The cover 98 is reversible to the position shown in Figure 23 for winter operation. In this position the evaporator compartment 38a is connected through opening 97 to the discharge duct 92, while the compartments 37a and 36a are connected through the opening 96.

A hollow cross member 99 encloses a duct 100 connected to the inlet scoop 95 as shown in Figure 22. The member 99 acts as a base for a motor 101 which is directly connected to two blowers 102 and 103. The blower 102 is permanently connected at its discharge side to the evaporator compartment 38a through a duct 104, while a similar duct 105 permanently connects the discharge of blower 103 with the lower part of the condenser-absorber compartment 37a. A pipe opening or collar 106 in the front wall of the compartment 36a is adapted to receive a warm air discharge pipe 107 leading into the passenger compartment 75 as shown in Figures 17 and 24 for winter operation, or to be capped as shown in Figures 18, 19 and 20 for summer operation.

A similar collar 108 in the forward wall of the evaporator compartment 38a connects the latter through a discharge pipe 109 with the passenger space 75 in summer, Figures 18, 19 and 20, and may be capped in winter as shown in Figures 17 and 24.

For summer operation the inlet elbow 110 of the blower 103 is connected to the cross duct 107 and thence into the inlet scoop 94, Figures 19 and 20, while when arranged for winter operation the elbow 110 is turned forward as shown in Figure 24 and connected to a screened inlet pipe 111 leading from the passenger space 75 and a cap 112 is used to close the opening into the hollow member 99. Similarly, the inlet elbow 113 of the blower 102 for summer operation is connected to an upwardly directed inlet pipe 114, but in winter is turned downward as shown in Figure 24 to connect into the cross duct 100 in the member 99. A cap 113a, Figure 20, may be used to close the opening to the duct 100 vacated by the elbow 113 in summer use.

While to simplify the illustration and explanation, changes between winter and summer arrangements have been shown as made by shifting pipes and capped openings, it will be obvious to those skilled in the art that the same result may be attained by permanent cross piping equipped with suitable dampers or valves such as 86, Figure 2.

A flapper check valve 115, Figure 22, is provided in the inlet scoop 94 beyond the opening of the cross duct 100. A pair of small stops 116 and 117 are arranged in the bottom of the scoop 94. In summer operation, when the car is in forward motion, the rush of air inward holds the valve open as shown in Figure 22. When the car stops the valve settles against the upper stop 116, thus preventing back-draft down the scoop from the chamber 37a. The flapper is loosely hinged, and for winter operation may be raised and dropped between the stops 116 and 117, preventing entry of outside air to the chamber 37a.

The operation of the device, in its alternative form, is substantially the same as that described for the preferred form previously described, except for the use of the two blowers, one replacing the engine fan which of course is not available in that location. In summer operation, Figures 18, 19, 20, 21 and 22, the blower 103 draws air through the cross-duct 100 and inlet scoop 94 and forces it into the absorber-condenser compartment 37a through the opening 105. Additional outside air also rushes up the scoop 94 and past the valve 115 into compartment 37a when the car is in motion, as described above. These combined air streams move upward through compartment 37a as shown in Figure 21, removing the heat from the absorber and condenser (omitted from Figure 21 for clarity), and discharge to the outside through duct 92 and discharge scoop 93. Meanwhile, the blower 102 draws air from the passenger space 75 through inlet pipe 114, circulates it through the evaporator compartment 38a where it is cooled and dehumidified, and returns it to space 75 through the pipe 109.

During winter operation the blower 102 draws outside air through the scoop 94 and cross duct 100 and discharges it through opening 97, duct 92 and scoop 93 to the outside as shown in Figure 23. A draft of outside air is thus maintained over the evaporator during winter use, allowing the evaporator to absorb outside heat into the system for the reversed refrigerating effect previously set forth. At the same time, the blower 103 draws air from the passenger space 75 through the screened inlet pipe 111, Figures 17 and 24, forces it through the condenser-absorber compartment 37a as shown in Figure 23, thence through opening 96, compartment 36a, collar 106 and pipe 107 into the space 75. The air in passing through the circuit described receives heat from the absorber, condenser (omitted in Figure 23 as noted) and finned partition 52a to maintain a continuously heated re-circulation of air through the passenger space.

It is obvious that the air inlets and outlets in the passenger space may be arranged at any desired location, but those shown, namely high for summer operation and low for winter, are preferred as giving the most desirable distribution of cooled or warmed air respectively. Where the pipes project upward through a luggage shelf 118, as in Figures 18, 19 and 20, the screened head 119 on the inlet pipe 114 prevents objects from falling therein and prevents blocking of the opening.

It has been noted that in the form and arrangement of the invention shown in Figure 1 the refrigerating means is actuated by heat applied thereto from the engine itself and that in summer operation heat is removed from the heat-rejecting section of the system by means of the engine's cooling means; namely, the fan 84 which provides the final heat removal from the radiator. When the device is in winter operation and the air pipe 82 is left in position as previously noted, the damper valve 86 instead of being completely closed may be cracked open slightly. This allows the blast from the fan 84 to drive a small amount of fresh air into the circulating air stream in the condenser-absorber compartment, thus furnishing make-up air to replace leakage and provide additional oxygen in the passenger space. This make-up air having been drawn directly through the radiator, is partially preheated and thus requires little additional heat after mixing with the circulating air.

The invention has been described principally as applied to an automobile, but it is obvious that it may also be used advantageously in connection with internal combustion engines in many stationary installations, for example in the case of a stationary engine having an adjacent cab or room for the operator. It will also be understood that although the typical absorption refrigerating plant is shown as employing the hydrogen cycle, as previously noted, this need not be the case, since any suitable type of absorption plant may be used to provide the three elements including a heat application section, a heat rejecting section and a heat absorbing section.

While the invention has been set forth in preferred form, it is not limited to the precise structures illustrated, as various changes and modifications may be made without departing from the scope of the appended claims.

What is claimed is:

1. In an automotive vehicle having a passenger space and a power plant including a fan, in combination, an absorption refrigerating device adjacent said power plant behind said fan and including a generator, a condenser, an evaporator and an absorber, means to conduct exhaust gases from said power plant in heat exchange relationship with said generator to operate said device, means operable by said fan to conduct a current of air over said condenser and said absorber, means independent of said fan to circulate a volume of air from said passenger space about said evaporator and back into said space, means between said fan and said condenser and absorber to disable said conducting means, and means to divert said volume of air from said evaporator to said condenser and absorber.

2. In an air-conditioning system for an automotive vehicle, said vehicle having a passenger space and a power plant including a fan, in combination, a casing behind said fan, a generator in said casing and operable by exhaust from said power plant, a condenser, an evaporator, an absorber cooperative with said generator, means to continuously circulate a current of air from said space through said casing and back to said space, means in said casing to direct said current about said evaporator whereby said circulating air may be cooled and dehumidified, and means operable by said fan and by the motion of said vehicle to direct a second current of air through said casing about said absorber and condenser.

3. An air-conditioning system as claimed in claim 2, including means to disable said second directing means, a gas-tight partition of heat conducting material within said casing adjacent said generator, and means to divert said first current of air from said evaporator and over said absorber, condenser and gas-tight partition whereby said first current of air may be heated, said evaporator being exposed to exterior air to absorb heat therefrom.

4. In an air-conditioning system for an automotive vehicle having a passenger space and an internal combustion engine, in combination, an absorption refrigerating plant operable by exhaust heat from said engine, said plant including a generator, a condenser, an evaporator and an absorber, means to transfer heat from the air of said space to said evaporator to cool said space in warm weather, and means to transfer heat individually from said condenser, absorber and generator to said air to warm said space in cool weather, part of said last named heat being extracted by said evaporator from the outer atmosphere and part being derived from said exhaust through said generator.

5. In an automotive vehicle having an internal combustion engine and a passenger space, in combination, an absorption refrigerating system including a generator operable by exhaust heat of said engine and an evaporator adapted to extract additional heat from the outer atmosphere, and means to transfer said exhaust heat and said atmospheric heat from said system to said passenger space, part of said transferred heat being derived by radiation from said generator.

6. In an automotive vehicle including a passenger space and an engine having an exhaust system, in combination, a casing, an absorption refrigerating plant in said casing including a generator operable by heat of said exhaust system, said casing having a compartment adjacent said generator, a gas-tight partition of heat conducting material between said generator and said compartment, said partition having fins adapted to receive heat from said generator and to conduct said heat to said compartment, an absorber and a condenser in said casing and cooperative with said generator, and means to circulate a current of air about said absorber, about said condenser, through said compartment, and through said passenger space whereby said space may be heated.

7. The combination claimed in claim 6 including a second compartment housing said absorber and condenser and normally communicating with said first compartment, a third compartment, an evaporator in said third compartment, means to close off communications from said first compartment to said second compartment and to said space, means to divert said circulating air current from said second compartment and to direct the same through said evaporator compartment whereby said space may be cooled, and means to force a second current of air through said second compartment to the exterior of said vehicle.

8. In an automotive vehicle, in combination, an engine, a radiator fan operable by said engine, an absorption refrigeration system including a generator and a condenser and an absorber, means to supply exhaust heat from said engine to said generator to operate the same, means to conduct air from said fan directly over said absorber and condenser to cool the same, and means to disable said directing means.

9. The combination claimed in claim 8 wherein said vehicle comprises a passenger space and including an evaporator cooperative with said generator, condenser and absorber, an enclosure about said evaporator, a blower independent of said fan and adapted to circulate air through said closure and said space, and means to divert said circulated air from said enclosure and directly over said condenser and absorber and in heat transfer relation with said generator.

10. In an automotive vehicle having a passenger space, in combination, an engine having a cooling radiator and a fan cooperative therewith, a refrigerating system including a condensing section behind said radiator and fan and an evaporator section, means to direct the blast of air from said fan over said condensing section to cool the same, means between said fan and said condensing section to regulate said directed blast, and mechanical means independent of said fan to circulate air through said evaporator section and said passenger space.

11. In an automotive vehicle having a space to be air-conditioned and an engine compartment, in combination, an engine in said compartment, a radiator fan operable by said engine, a wall between said space and said compartment, a casing arranged in said engine compartment adjacent said wall, an air inlet duct leading from said space through said wall and to the interior of said casing, an air discharge duct leading from the interior of said casing through said wall to said space, an absorption refrigerating plant in said casing including a generator, a condenser, an evaporator and an absorber, means to transfer heat from the exhaust gases of said engine to said generator to actuate said plant, a blower having its inlet connected to said inlet duct, means to direct the air current from said blower about said evaporator and through said discharge duct to said space, said casing having air louvres, an air pipe connected into said casing and extending toward said fan, a funnel on said pipe adjacent said fan to receive the air blast thereof and direct the same into said casing, and means in said casing to direct said blast about said absorber and condenser and outward through said louvres.

12. The combination claimed in claim 11 including an air filter in said inlet duct and directional fins on said discharge duct within said space.

13. The combination claimed in claim 11 including a second discharge duct from said casing to said space, said casing comprising a compartment containing said condenser and absorber, a shutter adapted to close said louvres and to open communication between said condenser-absorber compartment and said second discharge duct, outlet means on said blower adjustable to expose said evaporator to the outer atmosphere and to direct the air current from said blower into said condenser-absorber compartment and thence through said open communication and said second discharge duct to said space, means to close said first discharge duct, and means to close said air pipe.

14. The combination claimed in claim 11 including a closure within said casing adjacent said generator, a gas-tight partition between said generator and said closure and adapted to conduct heat from said generator into said closure, a second discharge duct from said closure to said space, said casing comprising a compartment containing said condenser and absorber, a shutter adapted to close said louvres and to open communication between said condenser-absorber compartment and said closure, outlet means on said blower adjustable to expose said evaporator to the outer atmosphere and to direct the air current from said blower into said condenser-absorber compartment and thence through said closure and said second discharge duct to said space, means to close said first discharge duct, and adjustable means to close said air pipe.

15. In an automotive vehicle, in combination, an internal combustion engine, means to cool said engine, a refrigerating system including a generator and a heat-rejecting section, means to apply heat from said engine to said generator, means operable by said engin cooling means to remove heat from said heat-rejecting section, means to disable said last named means, and means to transfer heat from said heat rejecting section and from said generator to the interior of said vehicle.

16. The combination claimed in claim 15 wherein said refrigerating system includes an evaporator section, and including means to transfer heat from said interior to said evaporator section.

17. In an air-conditioning system for a structure including a space to be air-conditioned and an internal combustion engine, in combination, an absorption refrigerating plant comprising a section for heat application, a heat rejecting section and a heat-absorbing section; means to apply exhaust heat from said engine to said first section to actuate said plant, means to transfer heat from the air of said space to said heat absorbing section to cool said space in warm weather, and means to transfer heat from said heat rejecting section and individually from said heat application section to said air to warm said space in cool weather.

18. In an air-conditioning system for a structure having a space to be air-conditioned and an internal combustion engine having cooling means, in combination, an absorption refrigerating plant operable by exhaust heat from said engine, means to transfer heat from the air of said space to said refrigerating plant to cool said space in warm weather, means to transfer heat from said refrigerating plant to said air to warm said space in cool weather, part of said last named heat being extracted by said plant from the outer atmosphere and part being derived from said exhaust through said plant, and means to introduce additional air into said space in cool weather, said additional air being pre-heated by said engine cooling means.

JAMES B. MONCRIEF.